(12) United States Patent
Iwama et al.

(10) Patent No.: US 8,695,539 B2
(45) Date of Patent: Apr. 15, 2014

(54) WATER HEATER AND CONTROL METHOD THEREFOR

(75) Inventors: Kazushi Iwama, Fuji (JP); Akito Watanabe, Fuji (JP); Jun Aiso, Fuji (JP)

(73) Assignee: Purpose Company Limited, Fuji-shi (JP)

( * ) Notice: Subject to any disclaimer, the term of this patent is extended or adjusted under 35 U.S.C. 154(b) by 714 days.

(21) Appl. No.: 12/907,545

(22) Filed: Oct. 19, 2010

(65) Prior Publication Data

US 2012/0090560 A1 Apr. 19, 2012

(51) Int. Cl.
*F22B 1/02* (2006.01)

(52) U.S. Cl.
USPC .............................. 122/31.1; 122/18.1; 237/19

(58) Field of Classification Search
USPC ........................... 122/15.1, 18.1, 31.1, 32, 33; 165/104.31, 292, 293; 237/19
See application file for complete search history.

(56) References Cited

U.S. PATENT DOCUMENTS

| | | | | |
|---|---|---|---|---|
| 6,606,968 B2 * | 8/2003 | Iwama et al. | ................. | 122/18.1 |
| 7,597,066 B2 * | 10/2009 | Shimada et al. | ............. | 122/18.1 |
| 2003/0131804 A1 * | 7/2003 | Iwama et al. | ................. | 122/18.1 |
| 2010/0122668 A1 * | 5/2010 | Ando | ............................ | 122/14.3 |
| 2011/0203788 A1 * | 8/2011 | Kato | ............................ | 165/292 |

FOREIGN PATENT DOCUMENTS

JP 5-060337 A 3/1993

* cited by examiner

*Primary Examiner* — Gregory A Wilson (74) *Attorney, Agent, or Firm* — Westerman, Hattori, Daniels & Adrian, LLP (57) ABSTRACT

A water heater includes combustion means (burner) that combusts fuel and generates exhaust; heat exchange means (primary heat exchanger and secondary heat exchanger) that exchanges heat of the exhaust for supplied water; bypassing means (bypass pipe) that makes the supplied water flow to an outlet of the heat exchange means; exchanged heat temperature detection means (exchanged heat temperature sensor) that detects temperature of the supplied water after heat exchange; flow rate adjustment means (bypass valve) that adjusts a volume of the supplied water flowing into the bypassing means and the heat exchange means; and a control unit that controls the flow rate adjustment means so as to make a predetermined volume of the supplied water or over flow to the heat exchange means.

13 Claims, 10 Drawing Sheets

BYPASS VALVE OPENING TABLE 94

| CATEGORIES | OPENING OF VALVE | | | |
|---|---|---|---|---|
| | $T_s < 54°C$ $QTH < T_s$ | $T_s \geq 54°C$ $QTH < T_s$ | $T_s < 54°C$ $QTH \geq T_s$ | $T_s \geq 54°C$ $QTH \geq T_s$ |
| SOLE | FULL OPEN FOR HOT WATER SUPPLY PART | FULL OPEN FOR HOT WATER SUPPLY PART | FULL OPEN FOR WATER SUPPLY PART | FULL OPEN FOR HOT WATER SUPPLY PART |
| PRIORITY DEVICE IN PLURAL DEVICES | FULL OPEN FOR HOT WATER SUPPLY PART | FULL OPEN FOR HOT WATER SUPPLY PART | FULL OPEN FOR WATER SUPPLY PART | FULL OPEN FOR HOT WATER SUPPLY PART |
| NON-PRIORITY DEVICES IN PLURAL DEVICES | FULL OPEN FOR HOT WATER SUPPLY PART | FULL OPEN FOR HOT WATER SUPPLY PART | FULL OPEN FOR WATER SUPPLY PART | FULL OPEN FOR HOT WATER SUPPLY PART |

WATER HEATER AND CONTROL METHOD THEREFOR

BACKGROUND OF THE INVENTION

1. Field of the Invention

The present invention relates to a water heater in which the supply of hot water and temperature thereof are adjusted to a required level, and in which air staying in pipes, especially in a heat exchanger is discharged.

2. Description of the Related Art

There is a case where remaining air stays inside a water supply pipes etc. in a water heater. This remaining air may stay while concentrating in a certain place according to the arrangement of pipes in the water heater. There is also a case where warmer air stays in upper pipes in the water heater compared with cooler water according to a change in temperature of water or hot water in the pipes. Further, there is also a case where air stays in pipes when the water heater has not been used for a long time.

When remaining air stays inside a heat exchanger, heat is not exchanged sufficiently between exhaust and supplied water. Especially, when the flow rate of the supplied water to the inside of the heat exchanger is low, heating the water to setting temperature is difficult because air remaining therein-side cannot be pushed out.

It is known as a device that makes temperature of such supplied water flowing through the inside of a heat exchanger constant that means for bypassing a heat exchanger, flow rate adjustment means therefor are included and a bypass is closed after a start of operation to make water flow into the heat exchanger (for example, Japanese Laid-open Patent Publication No. 05-060337).

There is a problem that when remaining air stays inside a heat exchanger and heat is not exchanged sufficiently continuously, there may be a risk that temperature of a fin pipe of the heat exchanger becomes extraordinarily high to damage the heat exchanger.

There is a circulating instantaneous water heating system in which an air vent or an air separator, which is automatic air vent means, is disposed at upper pipes to remove the air. However, there is often a case that the system is not disposed because the system makes a device complex.

There is also a problem that: when a circulation pump in a water heater is started to operate, hot water in a heat exchanger is mixed with water in a bypass pipe; hot water of high temperature is not discharged even if a hot water faucet is opened just after the start of water heating; and remaining air cannot be discharged to stay in pipes.

Concerning such problems, there is no disclosure or suggestion thereof in Japanese Laid-open Patent Publication No. 05-060337, and no disclosure or suggestion about the structure etc. for solving them is presented.

SUMMARY OF THE INVENTION

An object of the present invention is to make supplied water of a predetermined flow rate flow into pipes in a heat exchanger, and to discharge remaining air from the heat exchanger.

To achieve the above object, a water heater of the present invention includes combustion means, heat exchange means, bypassing means, exchanged heat temperature detection means, flow rate adjustment means and a control unit. The combustion means combusts fuel and generates exhaust. The heat exchange means exchanges heat of the exhaust for supplied water. The bypassing means makes the supplied water flow to an outlet of the heat exchange means. The exchanged heat temperature detection means detects temperature of the supplied water after heat exchange. The flow rate adjustment means adjusts a volume of the supplied water flowing into the bypassing means and the heat exchange means. The control unit controls the flow rate adjustment means so as to make a predetermined volume of the supplied water or over flow to the heat exchange means. According to such structure, the above object can be achieved.

In the water heater of the present invention, preferably, the flow rate adjustment means may include a switching valve that determines a flow rate of the supplied water to the bypassing means or the heat exchange means according to an opening thereof.

The water heater of the present invention may preferably include timekeeping means that times elapsed time since combustion execution by the combustion means, wherein the control unit makes the flow rate adjustment means execute adjustment of a flow rate of the supplied water to the heat exchange means when the elapsed time is a predetermined time or over.

In the water heater of the present invention, preferably, the control unit may make the flow rate adjustment means execute adjustment of a flow rate to the heat exchange means when water heating setting temperature is a predetermined value or over, or when the water heating setting temperature is below the predetermined value and temperature detected by the exchanged heat temperature detection means is below the water heating setting temperature.

In the water heater of the present invention, preferably, the control unit may adjust the flow rate adjustment means so that the supplied water is not allowed to flow to the heat exchange means when water heating setting temperature is below a predetermined value and temperature detected by the exchanged heat temperature detection means is the water heating setting temperature or over.

The water heater of the present invention includes water supply temperature detection means and flow rate detection means. The water supply temperature detection means detects temperature of the supplied water before heating. The flow rate detection means detects a volume of the supplied water. The control unit sets a minimum flow rate of the supplied water, which is allowed to flow to the heat exchange means, and adjusts the flow rate adjustment means based on at least the minimum flow rate, water heating setting temperature, the volume of the supplied water, temperature of the supplied water before heating and temperature of the supplied water after heat exchange.

In the water heater of the present invention, preferably, the control unit may calculate combustion for the combustion means so as to meet the water heating setting temperature based on the minimum flow rate of the supplied water, that is set, and outputs combustion control.

To achieve the above object, a water heating control method of the present invention includes exchanging in heat, bypassing, detecting temperature, adjusting flow rate and controlling. Said exchanging in heat exchanges in heat exchange means heat of exhaust generated by combusting fuel for supplied water. Said bypassing makes through bypassing means the supplied water flow to an outlet of the heat exchange means. Sais detecting temperature detects temperature of the supplied water after heat exchange. Said adjusting flow rate adjusts by flow rate adjustment means a volume of the supplied water flowing into the bypassing means and the heat exchange means. Said controlling controls the flow rate adjustment means so as to make a predetermined volume of the supplied water or over flow to the heat exchange means. According to such structure, the above object can be achieved.

The water heating control method of the present invention may preferably include timing and executing flow rate adjustment. Said timing times elapsed time since combustion execution by combustion means. Said executing flow rate adjustment makes the flow rate adjustment means execute adjustment of a flow rate to the heat exchange means when the elapsed time is a predetermined time or over.

The water heating control method of the present invention may preferably include making the flow rate adjustment means execute adjustment of a flow rate to the heat exchange means when water heating setting temperature is a predetermined value or over, or when the water heating setting temperature is below the predetermined value and the temperature of the supplied water after the heat exchange is below the water heating setting temperature.

The water heating control method of the present invention may preferably include adjusting the flow rate adjustment means so that the supplied water is not allowed to flow to the heat exchange means when water heating setting temperature is below a predetermined value and temperature of the supplied water after heat exchange is the water heating setting temperature or over.

The water heating control method of the present invention may preferably include detecting temperature, detecting a volume of water, setting a minimum flow rate and adjusting the flow rate. Said detecting temperature detects temperature of the supplied water before heating. Said detecting a volume of water detects a volume of the supplied water. Said setting a minimum flow rate sets a minimum flow rate of the supplied water, which is allowed to flow to the heat exchange means. Said adjusting the flow rate adjusts the flow rate adjustment means based on at least the minimum flow rate, water heating setting temperature, the volume of the supplied water, water supply temperature and temperature of the supplied water after heat exchange.

The water heating control method of the present invention may preferably include calculating combustion and outputting combustion control information. Said calculating combustion calculates combustion for the combustion means so as to meet the water heating setting temperature based on the minimum flow rate of the supplied water that is set. Said outputting combustion control information outputs combustion control information based on the calculated combustion.

Any of the following effects can be obtained according to the above described water heater and control method therefor of the present invention.

(1) Bypass means is closed to make water that is supplied to a water heater flow to heat exchange means temporarily. Then, the inside of the heat exchange means is filled with the supplied water. Thereby, remaining air can be pushed out from the heat exchange means.

(2) Opening and closing operation of flow rate adjustment means is performed. Thus, such a simple process can discharge remaining air.

(3) Combustion control is performed so as to ensure the flow rate necessary for pushing out of remaining air. Thus, no influence is exerted on hot water supply at required temperature.

Other objects, features and advantages of the present invention will be more clearly understood by referring to attached drawings and each of embodiments.

DESCRIPTION OF THE PREFERRED EMBODIMENTS

First Embodiment

Figure 1:
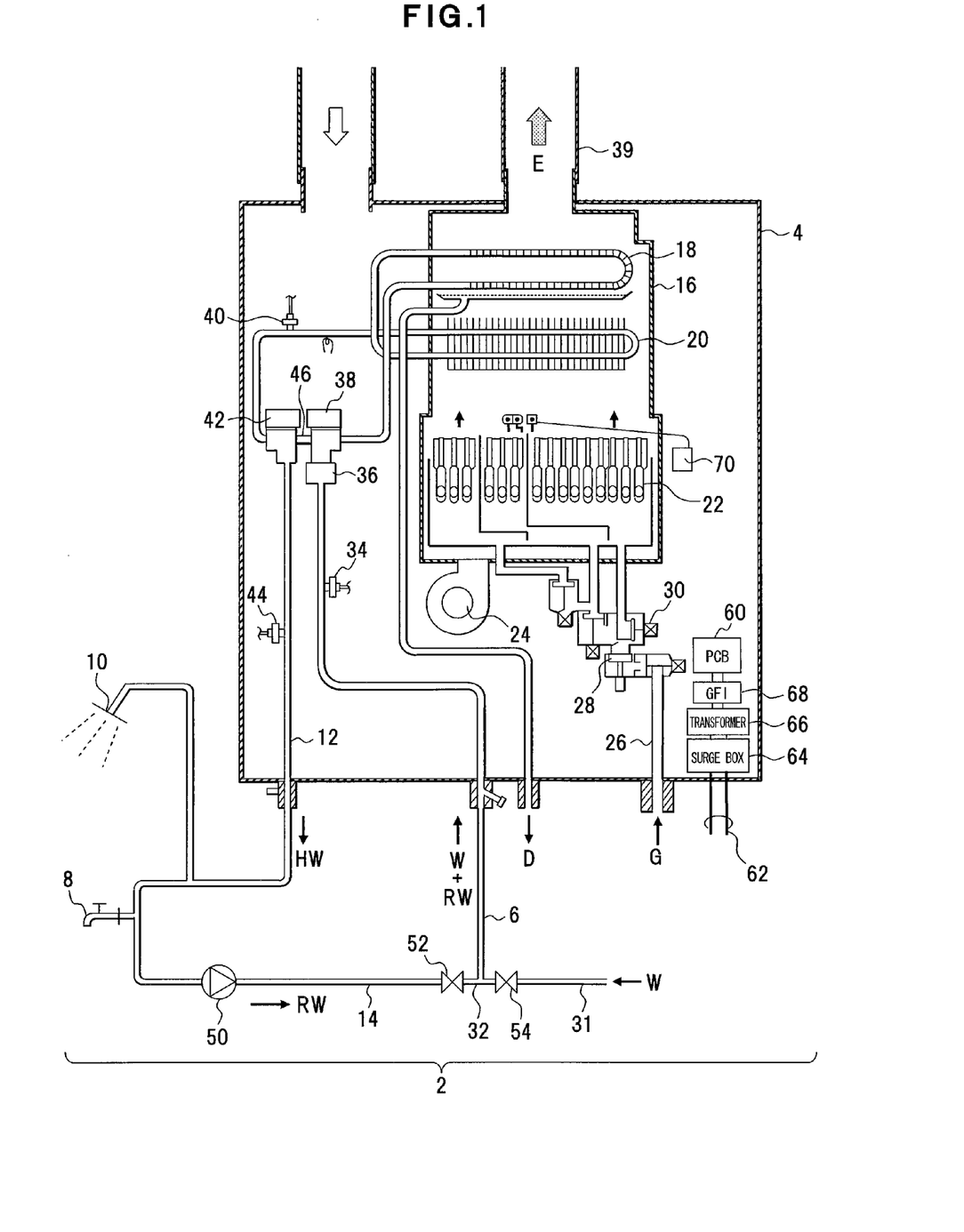
FIG. 1 depicts an example of structure of a water heater according to a first embodiment.
Figure 2:
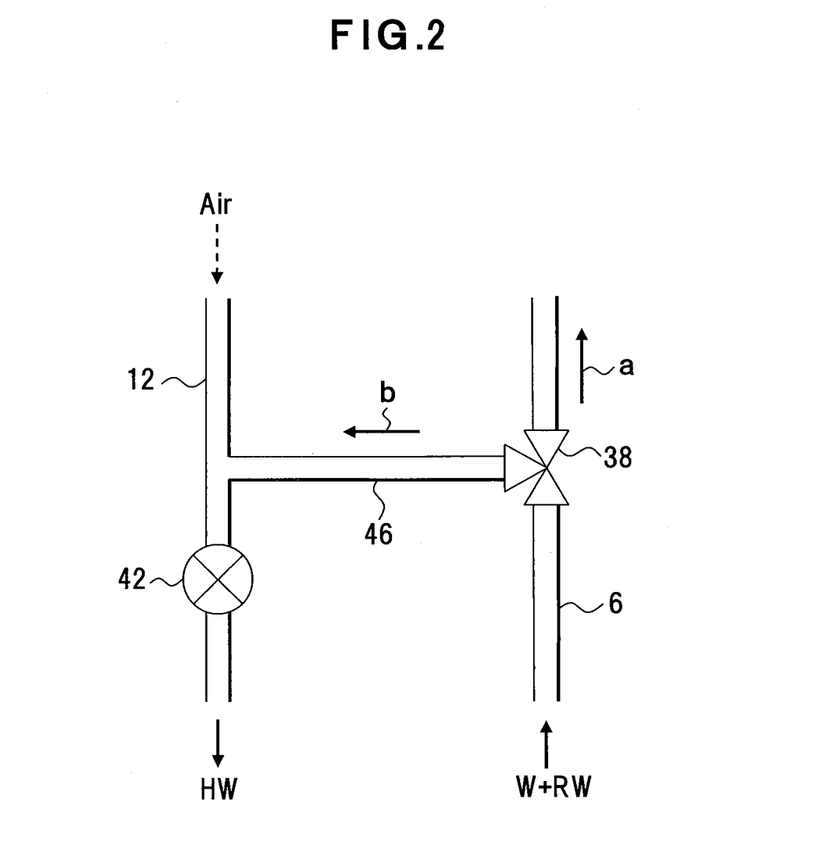
FIG. 2 depicts an example of structure of a bypass valve and an example of flow rate adjustment by the bypass valve.

A first embodiment will be described with reference to FIGS. 1 and 2. FIG. 1 depicts an example of structure of a water heater according to the first embodiment and FIG. 2 depicts an example of structure of a bypass valve and an example of flow rate adjustment by the bypass valve. Each structure depicted in FIGS. 1 and 2 is an example, and thus the present invention is not limited to such structure.

This water heater 2 is an example of a water heater of the present disclosure, and includes a combustion device 4 that heats supplied water such as tap water W to supply hot water, a water supply pipe 6 that supplies water to the combustion device 4 and a hot water supply pipe 12 that supplies hot water HW from the combustion device 4 to a hot water outlet 8 or a shower 10. The hot water supply pipe 12 has a circulation line 14 that makes the hot water HW, flowing through the hot water outlet 8 etc., join the water supply pipe 6 as return water RW and circulates the hot water HW. As the above, the water heater 2 constitutes an instantaneous water heating system in which hot water can be supplied instantaneously from the hot water outlet 8, the shower 10 or the like by circulating the hot water HW heated to predetermined temperature through the circulation line 14, the water supply pipe 6 and the hot water supply pipe 12 and keeping the heat thereof.

The combustion device 4 constitutes combustion means and heat exchange means for exchanging heat of supplied water for combustion E that is generated by combusting fuel gas G or the like to heat the supplied water, and supplying the hot water HW. A combustion chamber 16 of the combustion device 4 has a secondary heat exchanger 18 and a primary heat exchanger 20. The water supply pipe 6 introducing supplied water is connected to an inlet of the combustion chamber 16 and the hot water supply pipe 12 is connected to an outlet thereof. The combustion chamber 16 also includes a burner 22, a fan motor 24 and a gas supply pipe 26 as combustion means, a gas proportional valve 28 that controls the supply of the fuel gas G according to its opening and a gas solenoid valve 30 that supplies or blocks the fuel gas G according to its opening and closing.

As to the water heater 2, it is depicted that one combustion device 4 is operated solely. The invention is not limited thereto. A plurality of the combustion devices 4 may be linked to supply hot water.

The water supply pipe 6 is an example of means for supplying the tap water W and the return water RW to the combustion chamber 16, and for example, joins a tap water pipe 31 that introduces the tap water W from a water pipe and also joins the circulation line 14. A branch pipe 32 is included at the joint. In the branch pipe 32, the tap water W and the return water RW are mixed to be allowed to flow into the water supply pipe 6. The water supply pipe 6 has a water temperature sensor 34, a flow rate sensor 36 and a bypass valve 38 at the inside of the combustion device 4.

The water temperature sensor 34 is an example of means for detecting temperature of the tap water W and the return water RW which are supplied to the combustion device 4. The required quantity of heat or the like is calculated using the temperature detected by the water temperature sensor 34, and thus the combustion of the burner 22 is determined.

The flow rate sensor 36 is an example of flow rate detection means for detecting water supplied to the combustion device 4 and detecting flow rates of the supplied tap water W and return water RW. Opening control of the bypass valve 38 or the like is performed using the flow rates detected by the flow rate sensor 36.

The secondary heat exchanger 18 is an example of heat exchange means for exchanging heat of supplied water for mainly latent heat of the exhaust E generated by the burner 22.

The primary heat exchanger 20 is an example of heat exchange means for exchanging heat of supplied water for mainly sensible heat of the exhaust E generated by the burner 22. In the combustion device 4, the secondary heat exchanger 18 is disposed upstream of, and the primary heat exchanger 20 is disposed downstream of the water supply pipe 6 in order to increase heat absorption efficiency and in order to lower heat rejection temperature from a vent 39 as to the exhaust E.

The bypass valve 38 is an example of flow rate adjustment means for distributing supplied water to the secondary heat exchanger 18 and the hot water supply pipe 12, and the opening of the bypass valve 38 is controlled based on, for example, required water heating temperature and the required water heating supply. The bypass valve 38 introduces a part of the tap water W of low temperature and a part of the return water RW to the hot water supply pipe 12 by bypassing the secondary heat exchanger 18 and the primary heat exchanger 20. The tap water W and the return water RW, which the bypass valve 38 makes flow, join the heated hot water HW, for example, at a water control valve 42 of the hot water supply pipe 12.

The hot water supply pipe 12 is an example of means for introducing the hot water HW heated in the secondary heat exchanger 18 and the primary heat exchanger 20 to the outlet of the combustion device 4, and, for example, includes an exchanged heat temperature sensor 40 detecting temperature of the hot water HW just after heat exchange, the water control valve 42 and a hot water temperature sensor 44 detecting temperature of the hot water HW in a hot water supply part.

The exchanged heat temperature sensor 40 is an example of means for detecting the temperature of the hot water HW just after heat exchange. The control of the opening of the bypass valve 38 and the combustion control of the burner 22 are, for example, performed using the temperature detected by the exchanged heat temperature sensor 40.

The hot water temperature sensor 44 is an example of temperature detection means for the hot water HW just before being supplied from the combustion device 4. In water heating control, the control of the opening of the bypass valve 38 and the combustion control of the burner 22 are performed so that the temperature detected by the hot water temperature sensor 44 is identical to or near water heating setting temperature.

The water control valve 42 is an example of flow rate adjustment means for controlling the supply of outgoing hot water from the combustion device 4. The water control valve 42 controls the flow rate of the hot water HW that is adjusted to required temperature for outgoing hot water by mixing the hot water HW of high temperature, heated in the secondary heat exchanger 18 and the primary heat exchanger 20, with supplied water of low temperature, flowing through a bypass pipe 46. The supply of water for the water supply pipe 6 and the combustion of the burner 22 may be controlled according to the opening of the water control valve 42. The openings of the water control valve 42 and the bypass valve 38 may also be controlled by the comparison of the temperature detected by the hot water temperature sensor 44 with the water heating setting temperature.

The circulation line 14 is an example of means for circulating the outgoing hot water HW through the water supply part and keeping the heat of the outgoing hot water HW. The circulation line 14 reintroduces the hot water HW, supplied from the combustion device 4, to the water supply pipe 6. The return water RW circulated to the water supply pipe 6 is mixed to the tap water W and is reheated in the combustion device 4. The circulation line 14, for example, joins the tap water pipe 31 which supplies the tap water W, and is connected to the water supply pipe 6. The circulation line 14 has a circulation pump 50, and also has a check valve 52 just before the joint to the water supply pipe 6 and the tap water pipe 31.

The circulation pump 50 is an example of means for pumping the return water RW in the circulation line 14 to the water supply pipe 6. Driving the circulation pump 50 makes the return water RW flow to the combustion device 4 against the water supply pressure of the tap water W. The circulation pump 50 provides, for example, an electromagnetic switch. The circulation pump 50 can be operated by being linked to the water heating control and the combustion control because the electromagnetic switch is connected to a PCB (Printed Circuit Board) 60, which realizes a control function of the water heater 2, by a signal line.

The check valve 52 is an example of means for preventing the return water RW from flowing back to the circulation line 14 from the water supply pipe 6, and for preventing the tap water W from being mixed to the circulation line 14 from the tap water pipe 31. A check valve 54 is also disposed in the tap water pipe 31. Thus, both of the circulation line 14 and the tap water pipe 31, joining at the branch pipe 32, result preventing the return water RW and the tap water W from flowing back. Water supply pressure toward the water supply pipe 6 by a water pipe or the like acts on the check valve 54 of the tap water pipe 31, and pressure by circulation of the return water RW, applied by the circulation pump 50, acts on the check valve 54 thereof in a direction opposite to the water supply pressure. Therefore, if the hot water HW is consumed by the hot water outlet 8 or the like, the tap water W is supplied from the tap water pipe 31 to the water supply pipe 6 since the pressure from the circulation line 14 is reduced.

In addition, the water heater 2 has the PCB 60 realizing a control function. An electric supply line 62 is connected to the PCB 60, for example, and supplied AC current is inputted thereto via a surge box 64, a transformer 66 and a GFI 68. The surge box 64 is, for example, means for absorbing a surge from an AC source. The transformer 66 is means for changing a voltage of an AC source to a predetermined voltage.

In the water heater 2, when a hot water faucet or the like disposed at the hot water supply pipe 12 is opened, the tap water W and the return water RW are started to be supplied from the water supply pipe 6. This supply of water and the flow rate thereof are detected by the flow rate sensor 36. For example, this water supply detection makes the water temperature sensor 34 detect water supply temperature.

The PCB 60 that functions as a control function unit of the water heater 2 receives water flow detection information and water supply flow rate information by the flow rate sensor 36 and water supply temperature detection information by the water temperature sensor 34, executes a calculation process based on the information, and generates a control output. In response to the control output from the PCB 60, for example, the burner 22 is ignited by an igniter 70.

The hot water temperature sensor 44 detects temperature of the hot water HW at a hot water supply part compared with the hot water HW heated in the secondary heat exchanger 18 and the primary heat exchanger 20. When there is a difference between the temperature detected by the hot water temperature sensor 44 and water heating setting temperature set by a water heating request, the PCB 60 issues a command of, for example, control of the openings of the water control valve 42 and the bypass valve 38, or outputs a command of control of the combustion of the burner 22 to adjust water heating temperature.

Using the above structure, a process of discharging remaining air generated in pipes of the combustion device 4 is performed in the water heater 2. Remaining air generated in pipes may be based on the arrangement of the water supply pipe 6, the hot water supply pipe 12 and the circulation line 14 in the water heater 2, may occur when the combustion device 4 has not been used for a long time, or may be by the influence of the temperature of the surrounding air. As described above, when air stays in the heat exchangers 18 and 20 which touch the exhaust E of high temperature, there may occur a risk that pipes are extraordinarily heated, or hot water of high temperature is temporarily supplied from the hot water outlet 8 etc.

In order to discharge such remaining air, in the water heater 2, opening and closing control of valves, the combustion control, etc. are performed so that supplied water of a flow rate that can push out the remaining air flows into pipes. The process of discharging remaining air by opening and closing valves will be described with reference to FIG. 2.

As to the tap water W and the return water RW introduced from the water supply pipe 6 (supplied water), a predetermined water flow "a" is allowed to flow to the secondary heat exchanger 18 according to adjustment of the opening of the bypass valve 38, and the remaining water flow "b" is allowed to flow to the hot water supply pipe 12 through the bypass pipe 46. In normal water heating operation, the water flows "a" and "b" are determined by the water heating control based on the temperature detected by the water temperature sensor 34, the water heating setting temperature, the flow rate of supplied water, etc. or the combustion control of the burner 22. The water heating control and combustion control may be performed so that the temperature detected by the hot water temperature sensor 44 is the water heating setting temperature as to the hot water HW supplied from the combustion device 4.

The opening and closing control of the bypass valve 38 is used as means for discharging air remaining in pipes of the combustion device 4. As to the bypass valve 38, the water flow "a" to the heat exchangers 18 and 20 is increased before the combustion of the burner 22 is started, and is set so that the heat exchangers 18 and 20 are filled with supplied water. In the control of the opening of the bypass valve 38 in this remaining air prevention control process, it may be set that supplied water of a predetermined water flow or over, that is set based on the diameter of the water supply pipe 6, flows into the heat exchangers 18 and 20. Alternatively, the bypass valve 38 is fully opened for the heat exchangers 18 and 20, and the whole flow of supplied water may be allowed to the heat exchangers 18 and 20 temporarily.

Thereby, the water flow "a" of a predetermined value or over is allowed. Thus, air staying in the heat exchangers 18 and 20 is pushed out to the hot water supply pipe 12. The pushed air is discharged from, for example, the hot water outlet 8 or the shower 10 along with the hot water HW.

Figure 3:
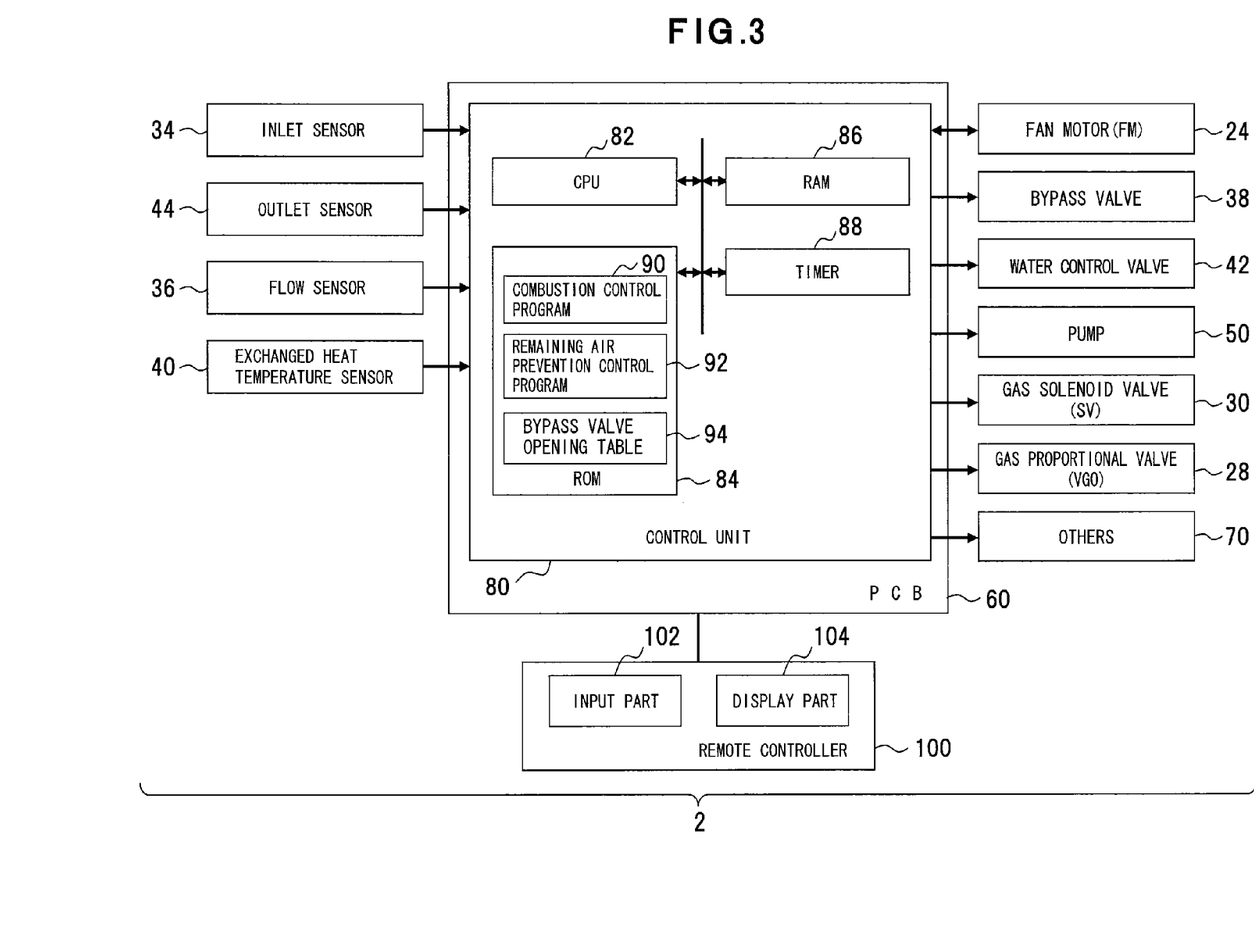
FIG. 3 depicts an example of structure of hardware of a control unit.
Figure 4:
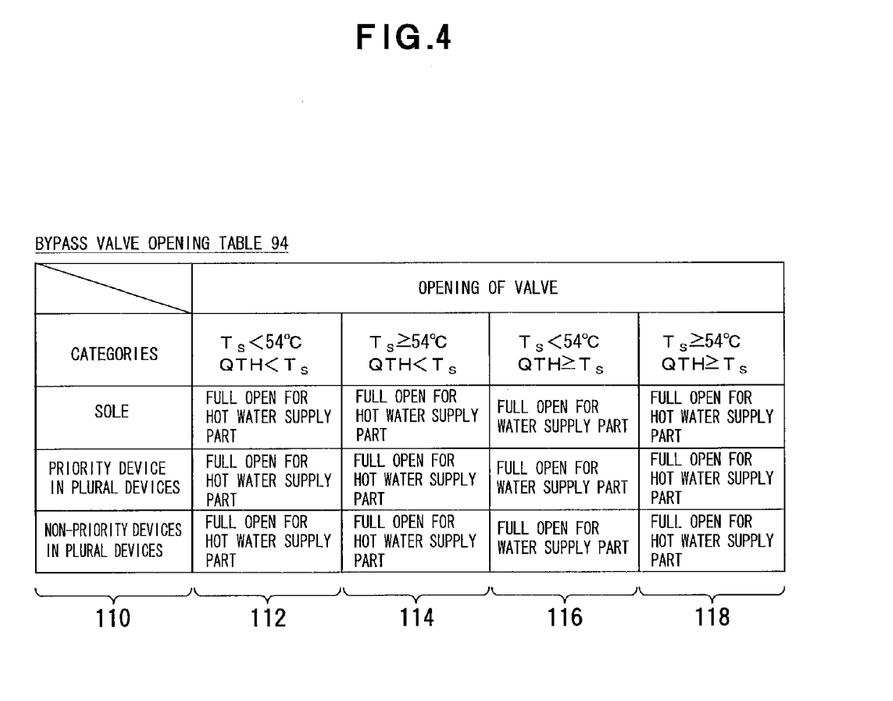
FIG. 4 depicts an example of a bypass valve opening table in a cold start.

An example of structure of a control unit of the water heater will be described with reference to FIGS. 3 and 4. FIG. 3 depicts an example of structure of hardware of a control unit of the water heater and FIG. 4 depicts an example of a bypass valve opening table in a cold start. Each structure depicted in FIGS. 3 and 4 is an example, and thus the present invention is not limited to such structure.

The PCB 60 of the combustion device 4 is composed by, for example, using a microcomputer, and functions as a control unit 80 of the combustion device 4 and the water heater 2. The control unit 80 is composed of, for example, input means for taking in detection information from each sensor disposed in the water heater 2, calculation means executing various calculations, storage means storing a control program etc. and output means outputting a control signal. The control unit 80 includes, for example, a CPU (Central Processing Unit) 82, a ROM (Read-Only Memory) 84, a RAM (Random-Access Memory) 86 and a timer 88.

The CPU 82 is an example of the calculation means, and executes a control program in the ROM 84 to output a control command as to the combustion control, the remaining air prevention control using detected temperature and the bypass valve 38, etc.

The ROM 84 is an example of the storage means, and stores, for example, a combustion control program 90 for water heating control, the burner 22, the fan motor 24 and the gas solenoid valve 30, a remaining air prevention control program 92 and a bypass valve opening table 94. The ROM 84 may store a thermal control program for the water heater 2 and a circulation control program for the circulation pump 50.

The bypass valve opening table 94 stored in the ROM 84, as depicted in FIG. 4, is used for a remaining air prevention process in a cold start, that is, for example, the first use of the water heater 2 before the burner 22 is started to be combusted, or a predetermined time having passed since the last water heating operation. For the bypass valve opening table 94, categories 110 are set such as a case where the combustion device 4 is used solely and where a plurality of combustion devices 4 are used together. In valve opening fields 112, 114, 116 and 118, valve openings are set according to whether setting temperature Ts is lower than a predetermined value, for example, 54 (° C.), or equal to or over the value, and whether temperature QTH, which is temperature just after heat exchange, is lower than the setting temperature Ts, or equal to or over the value. In this case, a valve opening is set in the valve opening field 112 when the setting temperature Ts is lower than 54 (° C.) and the temperature QTH is lower than the setting temperature Ts. A valve opening is set in the valve opening field 114 when the setting temperature Ts is 54 (° C.) or over and the temperature QTH is lower than the setting temperature Ts, a valve opening is set in the valve opening field 116 when the setting temperature Ts is lower than 54 (° C.) and the temperature QTH is the setting temperature Ts or over, and a valve opening is set in the valve opening field 118 when the setting temperature Ts is 54 (° C.) or over and the temperature QTH is the setting temperature Ts or over. In the valve opening control, "full open for a hot water supply part" is set in the valve opening fields 112, 114 and 118, the bypass valve 38 is fully opened for the heat exchangers 18 and 20, and all of supplied water is allowed to flow into the heat exchangers 18 and 20. "Full open for a water supply part" is set in the valve opening field 116, and all of supplied water is allowed to flow for the bypass pipe 46.

In the embodiment, the criterion is temperature inside the heat exchangers 18 and 20, which is detected by the exchanged heat temperature sensor 40, that is, temperature just after heat exchange as the detected temperature QTH that determines the valve opening. The invention is not limited thereto. Temperature of the hot water HW just before hot water supply detected by the hot water temperature sensor 44 may be used for the detected temperature QTH. In this case, when the setting temperature Ts is 54 (° C.) or over, or below 54 (° C.), and outgoing hot water temperature is below the setting temperature Ts, "full open for a hot water supply part" may be set (valve opening fields 112, 114 and 118). Categories of the valve openings may be set in "full open for a hot water supply part" (valve opening fields 112, 114 and 118) when outgoing hot water temperature is lower than the setting temperature Ts, or when the setting temperature Ts is higher than 54 (° C.) and the outgoing hot water temperature is higher than the setting temperature Ts, in view of the relationship between the setting temperature Ts and the detected temperature QTH.

The ROM 84, which stores the control program and the control table, may be composed of EEPROM (Electrically Erasable and Programmable Read Only Memory) that is rewritable electrically.

The control program and the table performing the water heating control and the remaining air prevention control are not limited to forms stored in the ROM 84. Forms stored in a computer-readable recording medium such as a magnetic disk, a flexible disk and an optical disk may be used.

The RAM 86 composes a work area for executing the above control program etc.

The timer 88 is an example of timekeeping means and obtains time information such as combustion time of the burner 22, elapsed time since the stop of the combustion, and operation time and operation stop time of the circulation pump 50. The remaining air prevention process is performed for the bypass valve 38 using the time information.

Temperature information such as water supply temperature, hot water temperature just after heat exchange and outgoing hot water temperature is inputted from the water temperature sensor 34, the exchanged heat temperature sensor 40 and the hot water temperature sensor 44 to the control unit 80 as detection information. Flow rate information is also inputted thereto from the flow rate sensor 36. Flame detection information may be inputted such as information whether there is FR current from a flame rod or not and information on measured current value.

Control information based on the input information is outputted to the fan motor 24, the bypass valve 38, the water control valve 42, the circulation pump 50, the gas solenoid valve 30, the gas proportional valve 28, etc. Other outputs may also be outputted such as an ignition command to the igniter 70 and an informing command to informing means such as a speaker, a buzzer and a display part.

The remote controller 100 or the like is connected to the PCB 60. The remote controller 100 includes, for example, an input part 102 as means for inputting control by a user as well as a power switch and an operation start switch. A display part 104 may be provided as information display means for displaying an operation state and a combustion state of the water heater 2.

Figure 5:
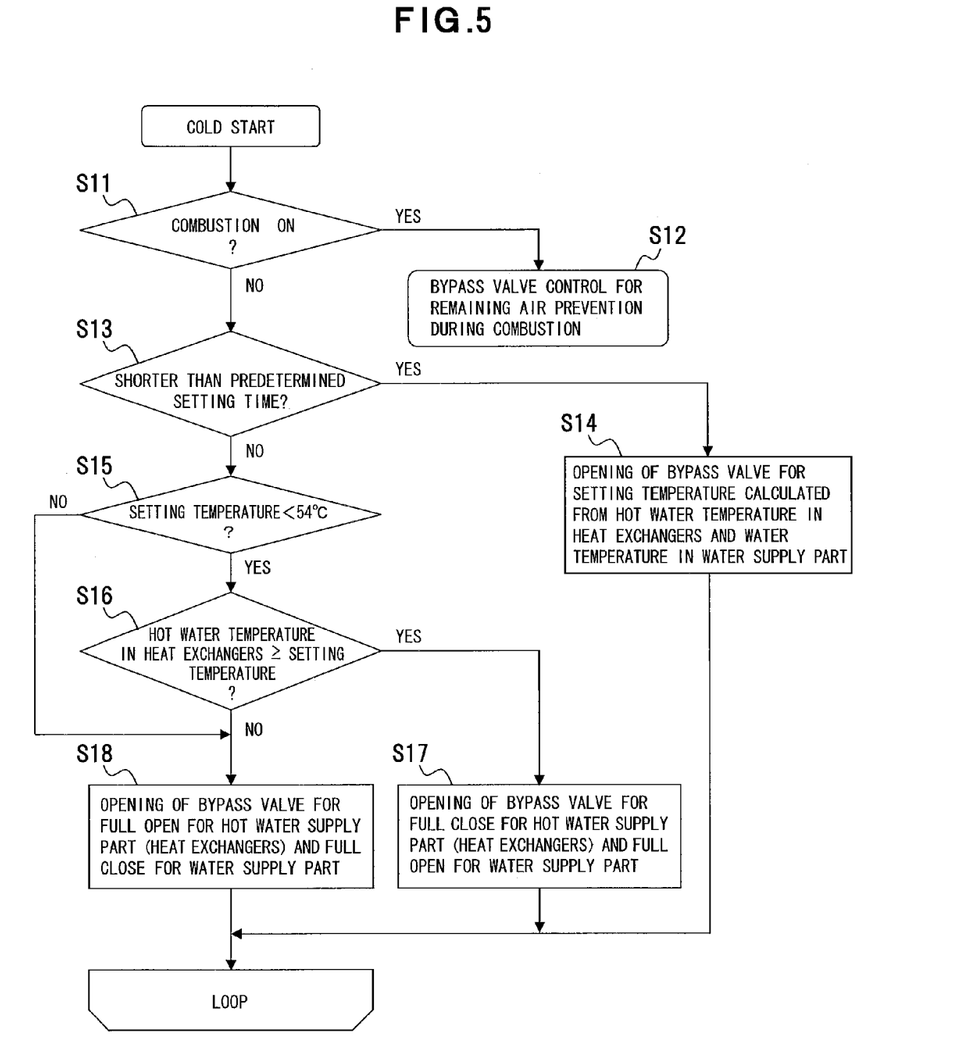
FIG. 5 is a flowchart depicting an example of a remaining air prevention control process in a cold start process.
Figure 6:
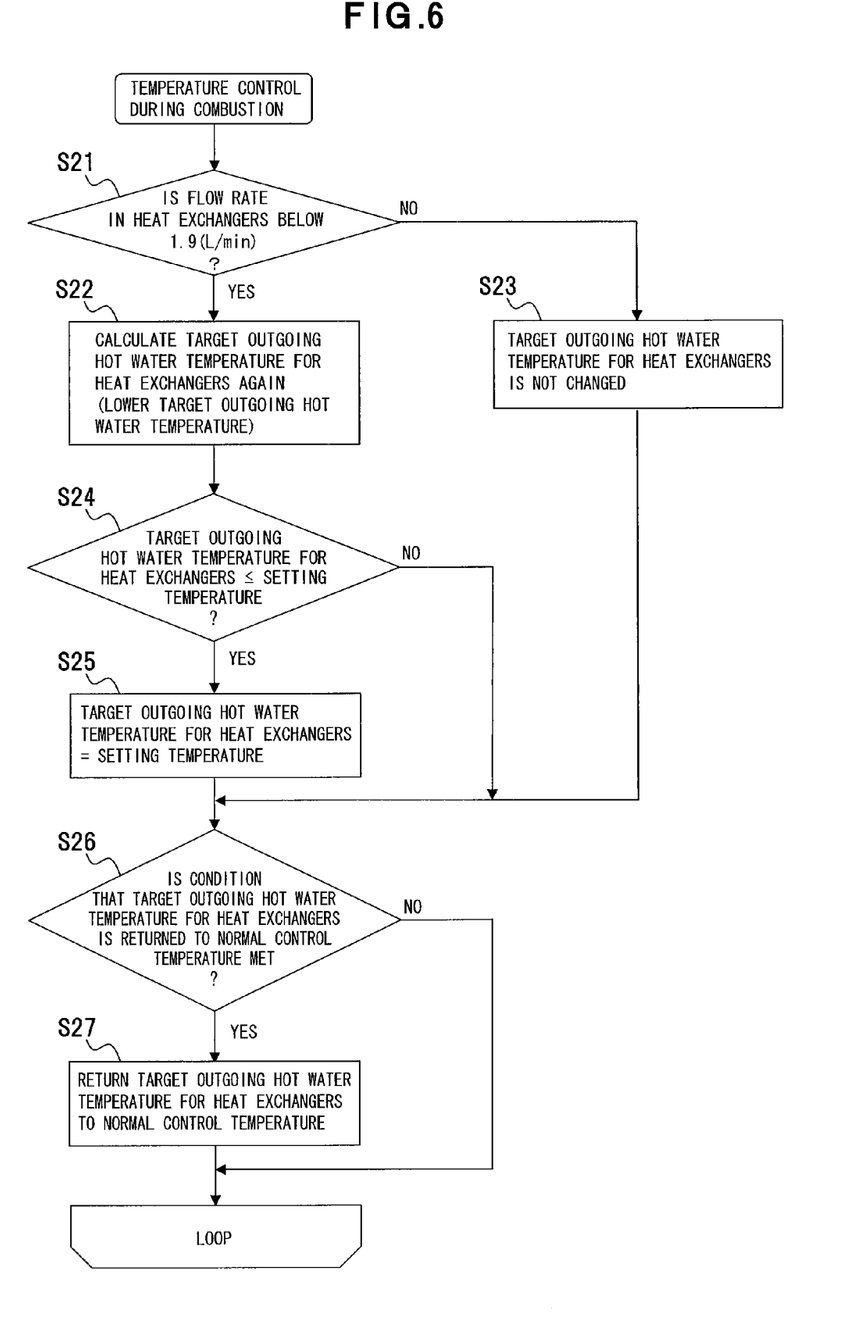
FIG. 6 is a flowchart depicting an example of a remaining air prevention control process by temperature control during combustion.

A process of remaining air prevention control will be described with reference to FIGS. 5 and 6. FIG. 5 is a flowchart depicting an example of the remaining air prevention control process in a cold start process and FIG. 6 is a flowchart depicting an example of the remaining air prevention control process by temperature control during combustion. Each processing content and processing procedure depicted in FIGS. 5 and 6 is an example, and thus the present invention is not limited thereto.

In the remaining air prevention control process in a cold start, the valve opening may be set according to temperature categories provided in the bypass valve opening table 94 (FIG. 4), and the setting temperature Ts and the temperature detected by the exchanged heat temperature sensor 40 are used. This setting temperature Ts is, for example, water heating setting temperature set in a water heating request.

Whether to start combustion of the burner 22 is determined (step S11). When combustion operation is being performed (YES of step S11), the process moves to bypass valve control for remaining air prevention during combustion (FIG. 6) (step S12).

In a case before the combustion operation (NO of step S11), it is determined whether elapsed time since water flowing to the combustion device 4 has been OFF by the last water heating operation is shorter than predetermined setting time (step S13). In this determination, for example, elapsed time since the operation of the combustion device 4 has been stopped, timed by the timer 88, is read out. When the elapsed time is shorter than the predetermined setting time (YES of step S13), the opening of the bypass valve 38 is set so that hot water of setting temperature, calculated based on hot water temperature in the heat exchangers and water supply temperature, can be supplied as normal water heating operation control (step S14). That is, when flowing water is allowed again after a short rest, the valve opening based on the normal water heating operation control is kept waiting in order to make instantaneous water heating of setting temperature possible.

With reference to water heating setting temperature, it is determined whether the setting temperature Ts is lower than predetermined temperature T1, for example, 54° C. (step S15). When the setting temperature Ts is lower than 54° C. (YES of step S15), the process moves to determination whether the temperature of hot water in the heat exchangers 18 and 20, QTH, is the setting temperature Ts or over (step S16). The temperature detected by the exchanged heat temperature sensor 40 is used for this temperature of hot water in the heat exchangers 18 and 20, QTH.

When the setting temperature Ts is lower than 54° C. and the hot water temperature in the heat exchangers 18 and 20 QTH is the setting temperature Ts or over (YES of step S16), this case is applied to the valve opening filed 116 in the bypass valve opening table 94. Thus, the opening of the bypass valve 38 is set so as to make all of supplied water flow to the bypass pipe 46. That is, the bypass valve 38 is fully closed for the hot water supply part (heat exchangers) and fully opened for the water supply part (step S17). As to the above, when the setting temperature Ts is low and temperature inside the heat exchangers 18 and 20 is high, there may be a risk that hot water of high temperature is supplied from the hot water outlet 8. Therefore, supplied water is not allowed to flow to the heat exchangers 18 and 20 and supplied water of low temperature is mixed with hot water of high temperature in the hot water supply part.

When the setting temperature Ts is 54° C. or over (NO of step S15) or when the hot water temperature in the heat exchangers 18 and 20 QTH is lower than the setting temperature Ts (NO of step S16), the bypass valve 38 is fully opened for the hot water supply part (heat exchangers) (step S18). These cases are applied to any of the valve opening fields 112, 114 and 118 in the bypass valve opening table 94. Air remaining in pipes can be pushed out by making all of supplied water flow to the heat exchangers 18 and 20.

The above process is repeatedly executed before the start of combustion operation.

The remaining air prevention control by temperature control during combustion operation will be described.

In this temperature control, as depicted in FIG. 6, the minimum flow rate of supplied water flowing in the heat exchangers 18 and 20 is set, and the water heating control is performed based on at least water heating setting temperature, the flow rate of supplied water, water supply temperature and temperature of supplied water just after heat exchange while this minimum flow rate is maintained.

The minimum flow rate L1 of supplied water flowing into the heat exchangers 18 and 20, 1.9 (L/min) is set, for example, and whether the minimum flow rate L1 is met is determined (step S21). The flow rate in the heat exchangers 18 and 20 may be calculated based on the temperature detected by the water temperature sensor 34, exchanged heat temperature sensor 40 and the hot water temperature sensor 44, and the whole water supply detected by the flow rate sensor 36. For example, the quantity of heat obtained by heat exchange is calculated from water supply temperature, hot water supply temperature and the supply of water, and the flow rate of the heat exchangers 18 and 20 may be calculated from the calculated quantity of heat and temperature just after the heat exchange.

From that determination, when the flow rate to the heat exchangers 18 and 20 is below 1.9 (L/min) (YES of step S21), target outgoing hot water temperature for the heat exchangers is calculated again (step S22). From this re-circulation, it is set that the target outgoing hot water temperature for the heat exchangers, detected by the exchanged heat temperature sensor 40, is lowered assuming that the rate of flowing in the heat exchangers 18 and 20 is 1.9 (L/min). The opening of the bypass valve 38 is adjusted, hot water of the target outgoing hot water temperature for the heat exchangers and supplied water that is allowed to flow into the bypass pipe 46 are mixed, and the hot water HW of optimum temperature is supplied.

When the flow rate in the heat exchangers is 1.9 (L/min) or over (NO of step S21), the target outgoing hot water temperature for the heat exchangers is not changed (step S23).

The target outgoing hot water temperature for the heat exchangers and the setting temperature Ts are compared (step S24). When the target outgoing hot water temperature for the heat exchangers is lower than the setting temperature Ts (YES of step S24), the combustion control is executed so that the target outgoing hot water temperature for the heat exchangers is the setting temperature Ts (step S25). In this case, when the target outgoing hot water temperature for the heat exchangers is lower than the setting temperature, water heating at the setting temperature Ts cannot be performed. Thus, the combustion control is executed so that the target outgoing hot water temperature for the heat exchangers is the setting temperature Ts.

When the target outgoing hot water temperature for the heat exchangers is higher than the setting temperature Ts (NO of step S24), water heating is continued under this situation.

It is determined whether the current situation meets a condition that the target outgoing hot water temperature for the heat exchangers is returned to normal control temperature (step S26). In this determination of returning to the normal control temperature, for example, it is determined that the condition is met when water heating of outgoing hot water temperature, for example, 60 (° C.) can be performed from incoming water temperature (temperature in the water part) if the heat exchangers have the minimum flow rate, L1.

When this condition of returning to the normal control temperature is met (YES of step S26), the target outgoing hot water temperature for the heat exchangers is returned to the normal control temperature (step S27). When the condition of returning the target outgoing hot water temperature for the heat exchangers to the normal control temperature is not met (NO of step S26), the process returns to step S21 again.

According to such structure, the bypass pipe is closed to make water that is supplied to the water heater flow to the heat exchangers temporarily. Then, the insides of the heat exchangers are filled with the supplied water. Thereby, remaining air can be pushed out from the heat exchangers. Opening and closing operation of the bypass valve is performed. Thus, a simple process can discharge remaining air. Combustion control is performed so as to ensure the flow rate necessary for pushing out of remaining air. Thus, no influence is exerted on hot water supply at required temperature.

Second Embodiment

Figure 7:
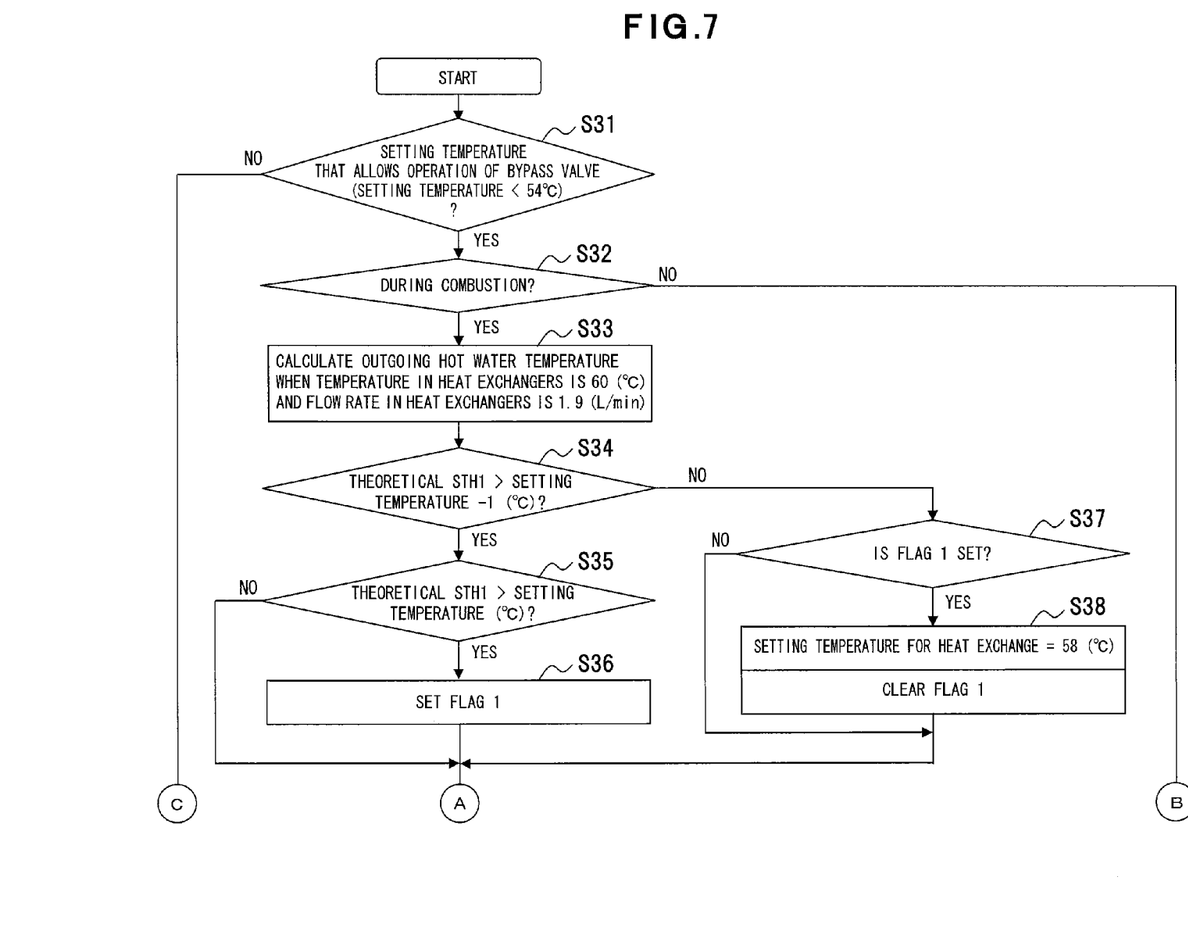
FIG. 7 is a flowchart depicting an example of a remaining air prevention control process during combustion according to a second embodiment.
Figure 8:
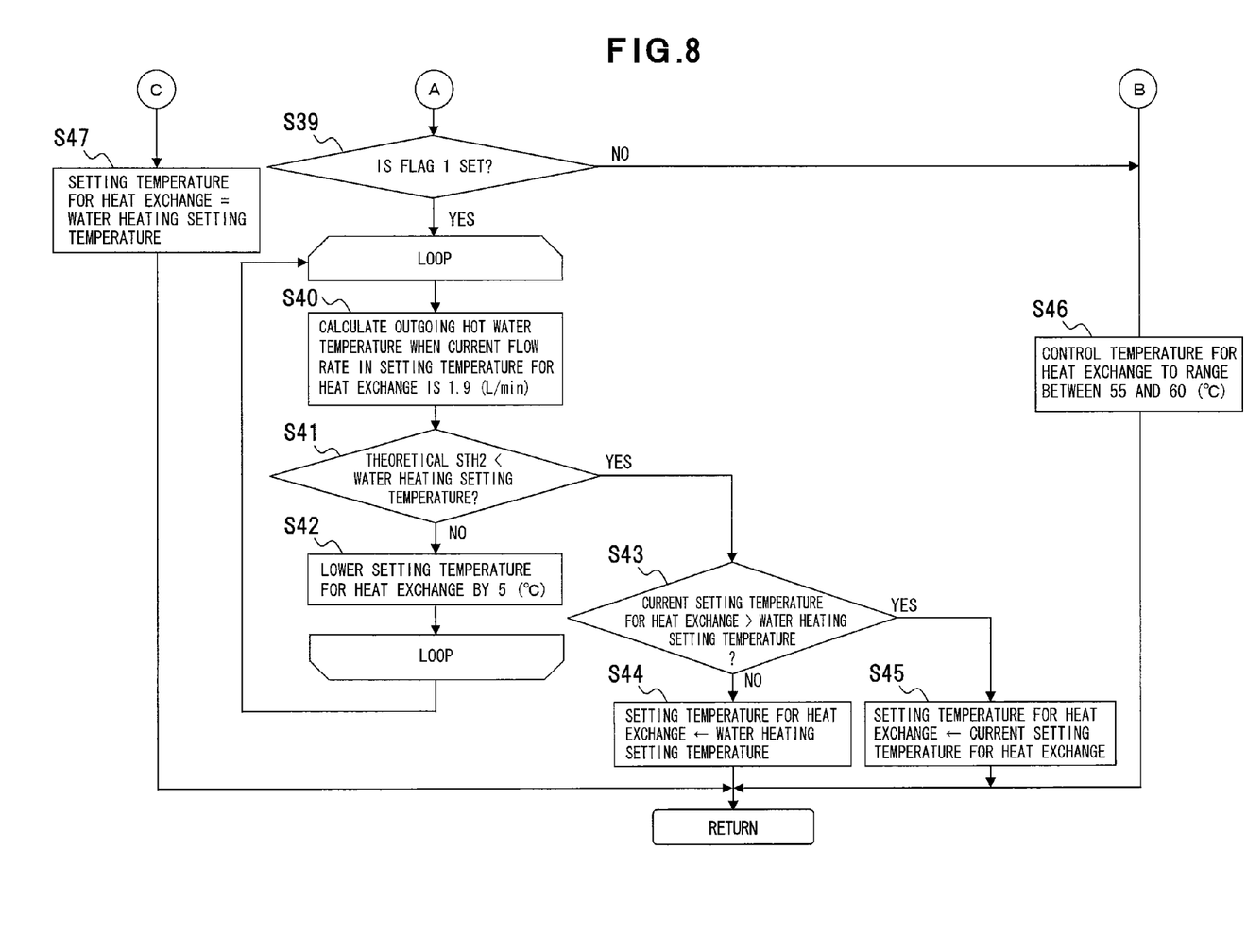
FIG. 8 is a flowchart depicting the example of a remaining air prevention control process during combustion.

A second embodiment will be described with reference to FIGS. 7 and 8. FIGS. 7 and 8 are flowchart depicting an example of a remaining air prevention control process during combustion according to the second embodiment. Each processing content and processing procedure depicted in FIGS. 7 and 8 is an example, and the present invention is not limited thereto. A, B and C in the figures depict connectors.

Here, an example of another control process will be depicted for lowering setting temperature for heat exchange during combustion operation of the combustion device 4 and securing the flow rate of supplied water for the heat exchangers 18 and 20.

It is determined whether to be the setting temperature Ts that allows the operation of the bypass valve 38 (step S31). This setting temperature Ts is an example of a setting value of outgoing hot water temperature required for the water heater 2. The opening or closing operation of the bypass valve 38 is permitted when the setting temperature Ts is lower than a predetermined value, for example, 54 (° C.).

In a case of the setting temperature that allows the operation of bypass valve (YES of step S31), whether the burner 22 is being combusted is confirmed (step S32). When the burner 22 is being combusted (YES of step S32), the process moves to a calculation process of outgoing hot water temperature (step S33). In this calculation process, theoretical outgoing hot water temperature STH1 when, for example, the minimum flow rate L1 of flowing to the heat exchangers 18 and 20 is 1.9 (L/min) and temperature in the heat exchangers 18 and 20 is 60 (° C.) is calculated. This outgoing hot water temperature STH1 is calculated from, for example, the following formula (1):

$$STH1 = \{(60 \times 1.9) + QIN \times (W - 1.9)\}/W \quad (1)$$

Here, QIN is water supply temperature detected by the water temperature sensor 34 and W is the supply of water detected by the flow rate sensor 36. The formula (1) is based on, for example, ratio of the quantity of heat that supplied water obtains by heat exchange.

When the calculated theoretical outgoing hot water temperature STH1 is higher than (setting temperature Ts−1) (°

C.) (YES of step S34) and when the theoretical outgoing hot water temperature STH1 is higher than the setting temperature Ts (YES of step S35), a flag 1 is set (Step S36). When the theoretical outgoing hot water temperature STH1 is higher than the setting temperature Ts, the condition of step S33 is met. For example, when temperature in the heat exchangers is 60 (° C.), it is represented that the flow rate of the heat exchangers is 1.9 (L/min) or over. The determination of (setting temperature Ts−1) (° C.) in step S34 is set for, for example, absorbing hysteresis generated in the change of temperature. The flag 1, representing that a setting condition of the theoretical outgoing hot water temperature STH1 is met, is set.

When the theoretical outgoing hot water temperature STH1 is (setting temperature−1) (° C.) or below (NO of step S34), the above setting condition is not met. Thus, when the flag 1 is set (YES of step S37), the flag 1 is cleared (step S38). Further, setting temperature for heat exchange is set to, for example, 58 (° C.). This setting temperature for heat exchange is temperature of hot water heated by the heat exchangers 18 and 20, and may use the temperature detected by the exchanged heat temperature sensor 40.

The process will move to management of the current flow rate of supplied water flowing in the heat exchangers and management of outgoing hot water temperature.

It is confirmed that the flag 1 is set (YES of step S39), and theoretical outgoing hot water temperature STH2 when the current flow rate in setting temperature for heat exchange is 1.9 (L/min) is calculated (step S40). The theoretical outgoing hot water temperature STH2 may be also calculated using ratio of the quantity of heat as described above, and for example, can be obtained from the following formula (2):

$$STH2=\{(\text{setting temperature for heat exchange} \times 1)+ QIN \times (W-1.9)\}/W \quad (2)$$

When the calculated theoretical outgoing hot water temperature STH2 is higher than the water heating setting temperature Ts (NO of step S41), the setting temperature for heat exchange is lowered by 5 (° C.), and the process returns to step S40 (step S42).

When the theoretical outgoing hot water temperature STH2 is lower than the water heating setting temperature Ts (YES of step S41), it is determined whether the current setting temperature for heat exchange is higher than the water heating setting temperature Ts (step S43). When the current setting temperature for heat exchange is the water heating setting temperature or below (NO of step S43), the water heating setting temperature Ts is used as the setting temperature for heat exchange (step S44). When the current setting temperature for heat exchange is higher than the water heating setting temperature Ts (YES of step S43), the current setting temperature for heat exchange may be used as it is (step S45).

As the above, hot water of temperature according to a water heating request can be supplied by adjusting the setting temperature for heat exchange in the heat exchangers 18 and 20 for the water heating setting temperature Ts. Remaining air prevention can be also executed by making supplied water of the minimum flow rate L1 flow to the heat exchangers 18 and 20.

When combustion operation of the burner 22 is not performed (NO of step S32) or when the condition of theoretical STH1 is not met and the flag 1 is not set (NO of step S39), temperature for heat exchange may be controlled to constant values, for example, 55 to 60 (° C.) (step S46). When the setting temperature Ts that allows the operation of the bypass valve 38 is 54 (° C.) or over (NO of step S31), the water heating setting temperature Ts may be set as setting temperature for heat exchange (step S47).

According to such structure, opening and closing operation of the bypass valve is performed. Thus, a simple process can discharge remaining air. Combustion control is performed so as to ensure the flow rate necessary for pushing out of remaining air. Thus, no influence is exerted on hot water supply at required temperature.

Third Embodiment

Figure 9:
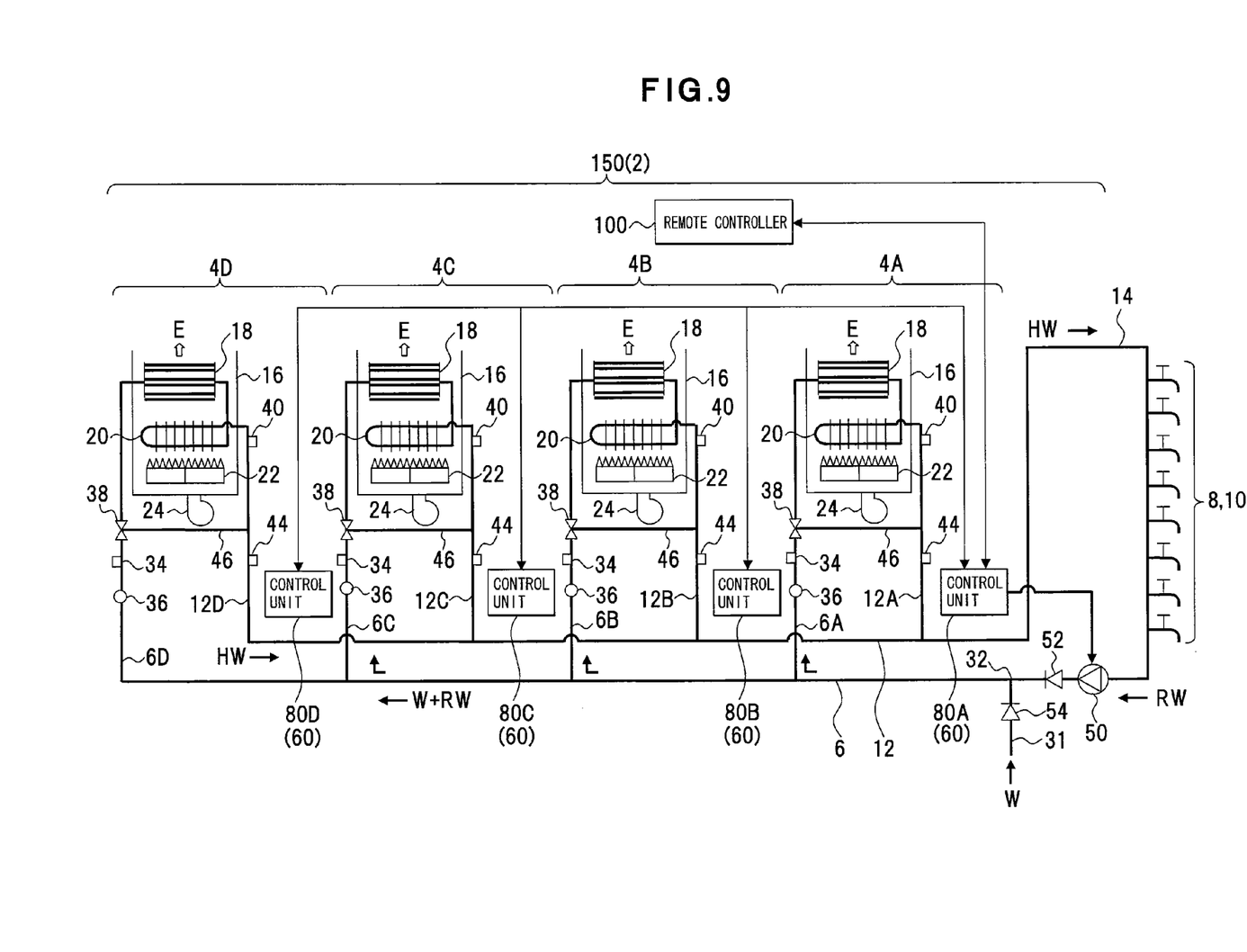
FIG. 9 depicts an example of structure of a water heater according to a third embodiment.

A third embodiment will be described with reference to FIG. 9. FIG. 9 depicts an example of structure of a water heater according to a third embodiment. Structure depicted in FIG. 9 is an example, and thus the present invention is not limited to such structure. In FIG. 9, the same components as those in FIG. 1 etc. are denoted by the same reference numerals, and description thereof is omitted.

This water heater 150 is an example of a water heater of the present invention. In the water heater 150, for example, some of plural combustion devices 4A to 4D, which are equivalent, are disposed in parallel, and the hot water HW is supplied to a hot water supply part using the water supply pipe 6 and the hot water supply pipe 12 commonly. In the water heater 150, the combustion devices 4A to 4D, the water supply pipe 6 and the hot water supply pipe 12 are circulated through the circulation line 14 disposed in the hot water supply part, and heat of hot water circulated therethrough is kept.

The combustion devices 4A to 4D provide control units 80A to 80D, respectively, for performing the combustion control in each device. In the water heater 150, for example, the combustion device 4A is set as a priority device (mother device). The control unit 80A of the combustion device 4A performs, for example, the remaining air prevention control, control of water heating temperature for the supply of water flowing all over the water heater and control of the operation of a circulation pump 50. The control units 80B to 80D of the combustion devices 4B to 4D, which are set as child devices, are connected to the control unit 80A, and perform the water heating control for the common water supply pipe 6 and the hot water supply pipe 12 by linking the control unit 80A.

In the water heater 150, the control unit 80A of the combustion device 4A may output the same control commands for all the combustion devices 4A to 4D as to the remaining air prevention control, the water heating control and thermal control. Alternatively, a common command on outgoing hot water temperature may be issued from the control unit 80A, and combustion control in each combustion device 4A to 4D based on incoming water temperature and outgoing hot water temperature and the remaining air prevention control may be performed by each control unit 80A to 80D individually.

The water heater 150 provides, for example, the remote controller 100 as an input device that allows a user to set required water heating temperature. The remote controller 100 is connected to, for example, the control unit 80A of the combustion device 4A that is a priority device by wire or wirelessly, and accepts an input such as setting temperature Ts for the water heater 150.

The determination of a priority device may be set in the water heater 150 in advance, or, may be set by a user. Among the combustion devices 4A to 4D, a priority device may be changed based on a predetermined condition. A connection destination of the remote controller 100 is not limited to a priority device. All the combustion devices 4A to 4D in the water heater 150 may be connected thereto.

Example

Figure 10:
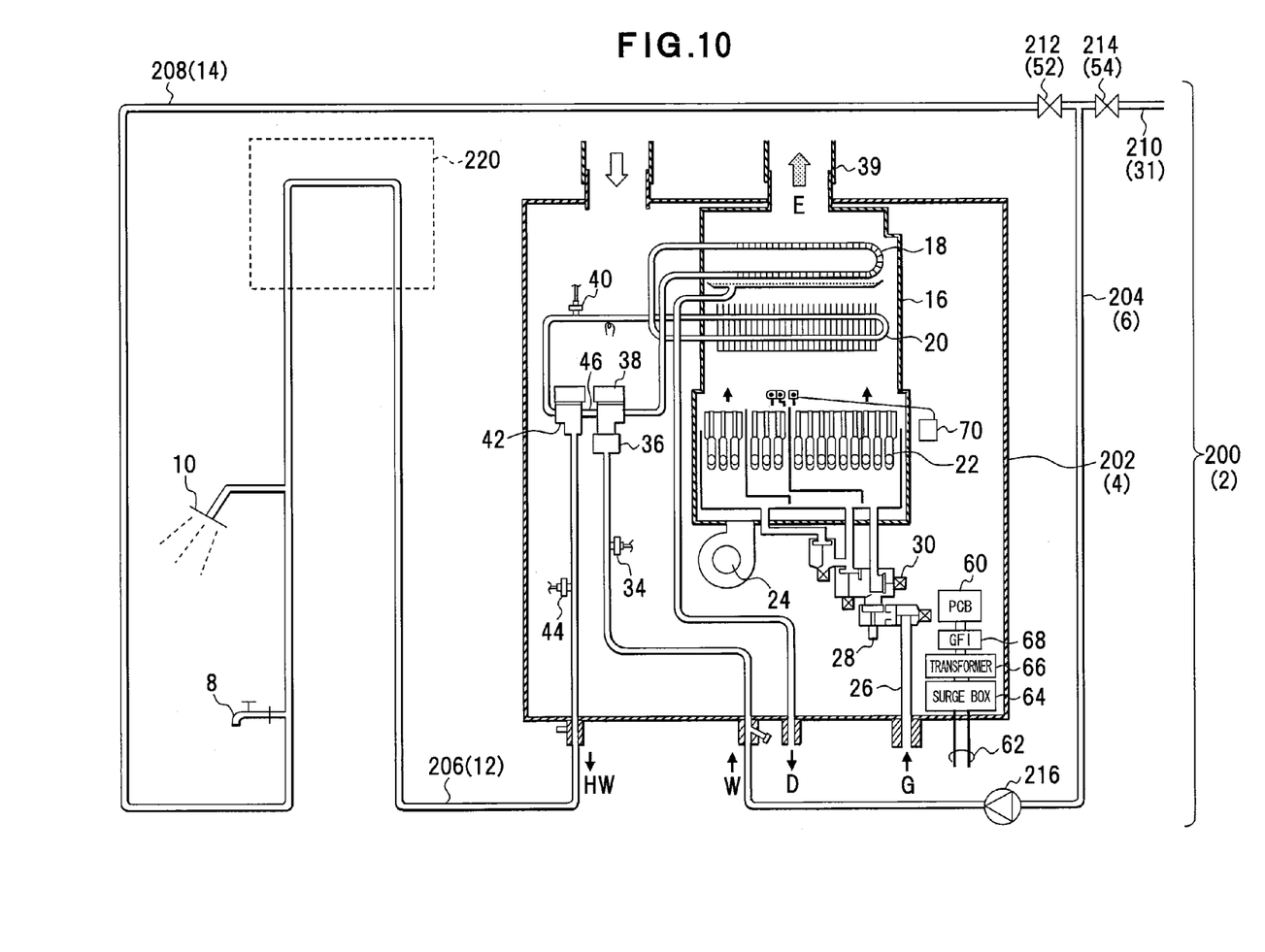
FIG. 10 depicts an example of arrangement of pipes in a water heater.

An example of a water heater will be described with reference to FIG. 10. FIG. 10 depicts an example of arrangement of pipes in a water heater. In FIG. 10, the same components as those in FIG. 1 etc. are denoted by the same reference numerals, and description thereof is omitted.

This water heater 200 is an example of a water heater of the present invention, and has, for example, a combustion device 202 that generates exhaust E and heats supplied water and a water supply pipe 204 that introduces tap water W and return water RW to the combustion device 202. A hot water supply pipe 206, having the hot water outlet 8 and the shower 10, is connected to a hot water supply part of the combustion device 202. A circulation line 208, connected to the hot water supply pipe 206 and returning hot water HW to the water supply pipe 204, is disposed.

A tap water pipe 210 that supplies the tap water W, the water supply pipe 204, the hot water supply pipe 206 and the circulation line 208 may be arranged along walls of a building. Check valves 212 and 214 are disposed in the circulation line 208 and the tap water pipe 210, and prevents the return water RW and the tap water W from flowing back. Further, water heater 200 sets, for example, a circulation pump 216 on the hot water supply pipe 204.

In the water heater 200, pipes that supply the tap water W and the return water RW to the combustion device 202 are introduced from the upper part than the combustion device 202. Similarly, the hot water supply pipe 206 is arranged so as to be introduced to the upper part than the combustion device 202. In a case of such arrangement, for example, a pipe arrangement part 220 occurs where hot water is allowed to flow to a higher place than the combustion device 202 and is dropped down to the hot water outlet 8. If a part where steep ups and downs of water and hot water is generated in the water supply pipe 204, the hot water supply pipe 206 and the circulation line 208, air is easy to stay inside. In the pipe arrangement of the water heater 200, there is no air vent device for discharging air generated in pipes.

Such pipe arrangement is used in, for example, a storage water heater, that is, heated hot water is stored in a storage tank and its heat is kept. Little inconvenience such as extraordinarily heating as described above occurs in a storage water heater even if air is mixed inside pipes.

In such pipe arrangement, according to the water heater 200 of the present invention, remaining air can be discharged from the combustion device 202 by the above described remaining air prevention control even if there is the pipe arrangement part 220 in a part of pipe arrangement, where pipes have steep ups and downs. Thus, extraordinarily heating etc. does not occur in the heat exchangers 18 and 20.

Features and advantages of the water heater and control method therefor of the present invention described above are as follows.

(1) The present invention relates to the water heater 2 having the bypass valve 38 and flow rate control method therefor.

(2) In the water heater of the present invention, air staying in the heat exchangers 18 and 20 of the low circulation can be discharged by flow rate control of the bypass valve 38. When the operation of the circulation pump 50 is started, the bypass valve 38 is opened and hot water in the heat exchangers 18 and 20 is mixed with supplied water in the bypass pipe 46. Thereby, there is no risk that hot water of high temperature is discharged even if a hot water outlet is opened just after instantaneous hot water supply operation.

(3) According to the water heater of the present invention, venting in the heat exchangers 18 and 20 can be performed at small cost irrelevantly to the number of disposed combustion devices 4 and conditions for disposing the combustion device 4.

(4) The water heater of the present invention includes, for example, heat exchange means for exchanging heat of exhaust by combustion of fuel, instruction means for instructing setting temperature and flow rate control means for controlling the flow rate of outgoing hot water.

(5) A water heating control method of the present invention includes, for example, exchanging heat of exhaust by combustion of fuel, instructing setting temperature and controlling the flow rate of outgoing hot water as flow rate control of the bypass valve 38.

(6) The water heater of the present invention includes, for example, heat exchange means for exchanging heat of exhaust by combustion of fuel, bypass means that is a water route for avoiding the heat exchange means, and flow rate control means for controlling the ratio of the rate of flowing to the heat exchange means to the rate of flowing to the bypass means. The water heater also includes comparison means for comparing instructed temperature with temperature in heat exchangers, and timekeeping means for timing elapsed time since the last combustion stop.

(7) According to the water heater or control method therefor of the present invention, in the early use, the effect of pushing out an air bank remained in the heat exchangers is increased by making all of water flow into the heat exchangers, so that the volume of air staying in the heat exchangers can be reduced.

(8) The water heater of the present invention includes temperature detection means for monitoring incoming water temperature, outgoing hot water temperature and mixture temperature, and the bypass valve 38. Bypass valve control is executed that an air bank in the heat exchangers, which is a cause of thermal stress cracking of the heat exchangers, is removed.

(9) In the control method of the water heater, in a normal combustion OFF standby state, the bypass valve 38 is on standby while fully closed for a hot water supply part (heat exchangers) and fully opened for a water supply part. Thereby, flowing water into the heat exchangers is allowed in a case of flowing water below the rate in the opening of the bypass valve 38, that is the flow rate where the combustion device is started to combust, and dews are prevented from being generated therein. The effect of pushing out air remaining in the heat exchangers can be maximally secured by increasing the flow rate in the heat exchangers.

Other Embodiments (1) In the above embodiments, it is represented that the primary heat exchanger 20 and the secondary heat exchanger 18 are provided in the combustion device 4. The present invention is not limited thereto. A combustion device having one heat exchanger may be used.

(2) In the above embodiments, the minimum flow rate L1 that allows the remaining air prevention process in pipes is represented as a constant value in the flow rate control during combustion and the combustion control. The present invention is not limited thereto. For example, the minimum flow rate may be changed according to the size of pipes disposed in the water heater 2, the state how the pipes are disposed or the size of pipes of the combustion device 4.

While the most preferred embodiments have been described hereinabove, the present invention is not limited to the above description, and it is a matter of course that various variations and modifications can be made by those skilled in the art within the scope of the claims without departing from the spirit of the invention disclosed herein, and needless to say, such variations and modifications are also encompassed in the scope of the present invention.

What is claimed is:

1. A water heater comprising:
    combustion means that combusts fuel and generates exhaust;
    heat exchange means that exchanges heat of the exhaust for supplied water;
    bypassing means that makes the supplied water flow to an outlet of the heat exchange means;
    exchanged heat temperature detection means that detects temperature of the supplied water after heat exchange;
    flow rate adjustment means that adjusts a volume of the supplied water flowing into the bypassing means and the heat exchange means; and
    a control unit that controls the flow rate adjustment means so as to make a predetermined volume of the supplied water or over flow to the heat exchange means.

2. The water heater of claim 1, wherein
    the flow rate adjustment means includes a switching valve that determines a flow rate of the supplied water to the bypassing means or the heat exchange means according to an opening thereof.

3. The water heater of claim 1, further comprising time-keeping means that times elapsed time since combustion execution by the combustion means,
    wherein the control unit makes the flow rate adjustment means execute adjustment of a flow rate of the supplied water to the heat exchange means when the elapsed time is a predetermined time or over.

4. The water heater of claim 1, wherein
    the control unit makes the flow rate adjustment means execute adjustment of a flow rate to the heat exchange means when water heating setting temperature is a predetermined value or over, or when the water heating setting temperature is below the predetermined value and temperature detected by the exchanged heat temperature detection means is below the water heating setting temperature.

5. The water heater of claim 1, wherein
    the control unit adjusts the flow rate adjustment means so that the supplied water is not allowed to flow to the heat exchange means when water heating setting temperature is below a predetermined value and temperature detected by the exchanged heat temperature detection means is the water heating setting temperature or over.

6. The water heater of claim 1, further comprising:
    water supply temperature detection means that detects temperature of the supplied water before heating; and
    flow rate detection means that detects a volume of the supplied water,
    wherein the control unit sets a minimum flow rate of the supplied water, which is allowed to flow to the heat exchange means, and adjusts the flow rate adjustment means based on at least the minimum flow rate, water heating setting temperature, the volume of the supplied water, temperature of the supplied water before heating and temperature of the supplied water after heat exchange.

7. The water heater of claim 6, wherein the control unit calculates combustion for the combustion means so as to meet the water heating setting temperature based on the minimum flow rate of the supplied water, that is set, and outputs combustion control.

8. A water heating control method, comprising:
    exchanging in heat exchange means heat of exhaust generated by combusting fuel for supplied water;
    making through bypassing means the supplied water flow to an outlet of the heat exchange means;
    detecting temperature of the supplied water after heat exchange;
    adjusting by flow rate adjustment means a volume of the supplied water flowing into the bypassing means and the heat exchange means; and
    controlling the flow rate adjustment means so as to make a predetermined volume of the supplied water or over flow to the heat exchange means.

9. The water heating control method of claim 8, further comprising:
    timing elapsed time since combustion execution by combustion means; and
    making the flow rate adjustment means execute adjustment of a flow rate to the heat exchange means when the elapsed time is a predetermined time or over.

10. The water heating control method of claim 8, further comprising:
    making the flow rate adjustment means execute adjustment of a flow rate to the heat exchange means when water heating setting temperature is a predetermined value or over, or when the water heating setting temperature is below the predetermined value and the temperature of the supplied water after the heat exchange is below the water heating setting temperature.

11. The water heating control method of claim 8, further comprising:
    adjusting the flow rate adjustment means so that the supplied water is not allowed to flow to the heat exchange means when water heating setting temperature is below a predetermined value and temperature of the supplied water after heat exchange is the water heating setting temperature or over.

12. The water heating control method of claim 8, further comprising:
    detecting temperature of the supplied water before heating;
    detecting a volume of the supplied water;
    setting a minimum flow rate of the supplied water, which is allowed to flow to the heat exchange means; and
    adjusting the flow rate adjustment means based on at least the minimum flow rate, water heating setting temperature, the volume of the supplied water, water supply temperature and temperature of the supplied water after heat exchange.

13. The water heating control method of claim 12, further comprising:
    calculating combustion for the combustion means so as to meet the water heating setting temperature based on the minimum flow rate of the supplied water that is set; and
    outputting combustion control information based on the calculated combustion.

* * * * *